Figure 1:
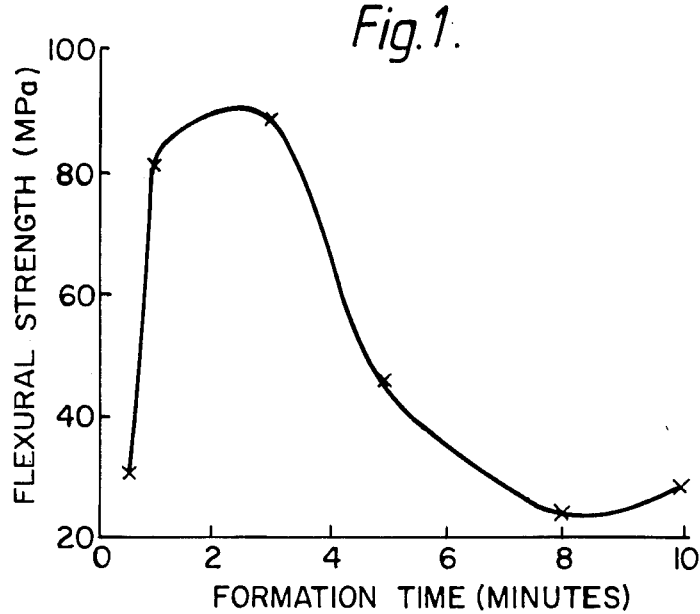
Figure 2:
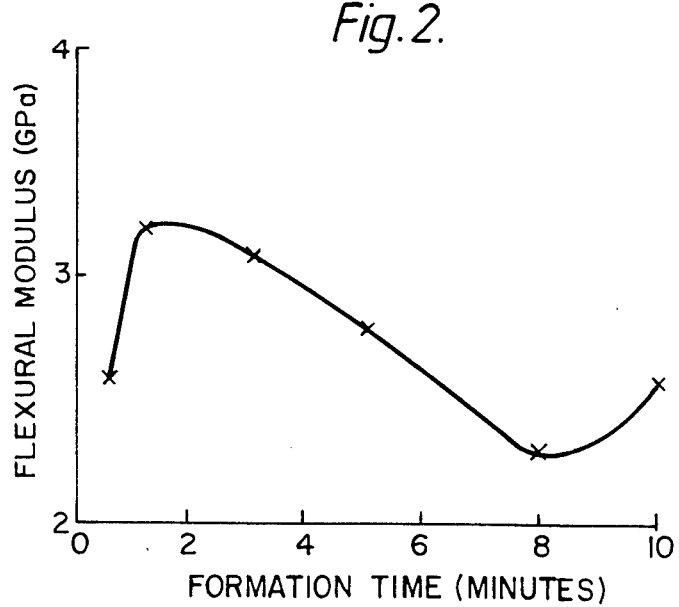
Figure 4:
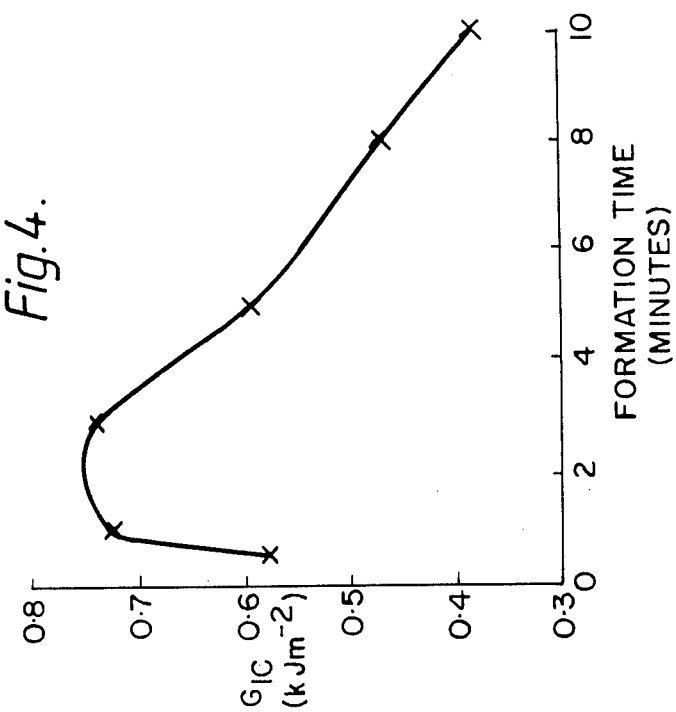
Figure 3:
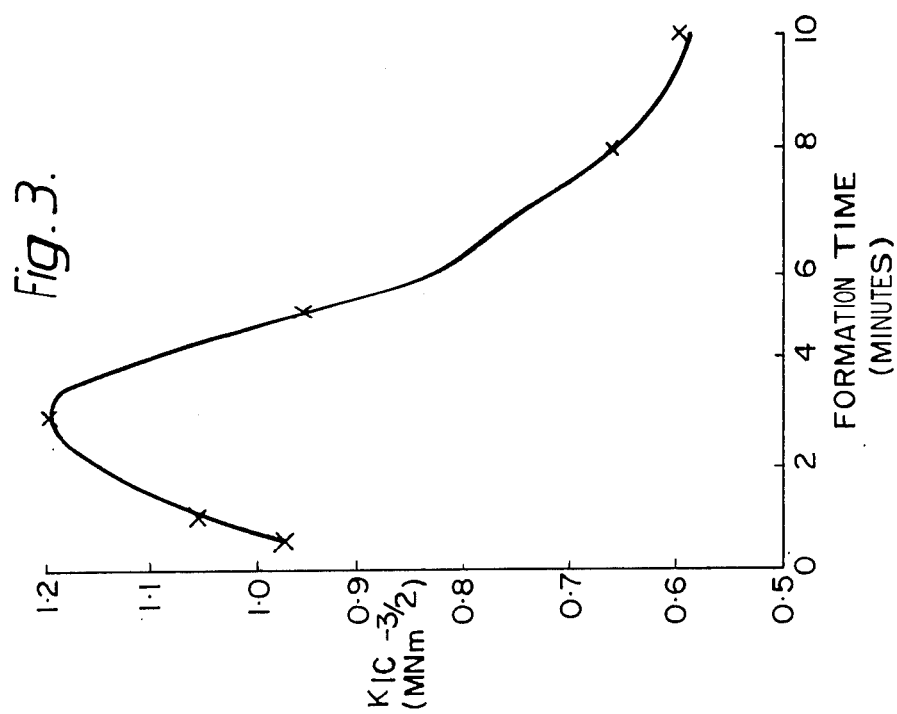

United States Patent [19]

Jones

[11] Patent Number: 4,808,695

[45] Date of Patent: Feb. 28, 1989

[54] CROSS-LINKED POLYMER FROM AROMATIC DICARBOXYLIC ACID ANHYDRIDE IMIDE

[75] Inventor: Michael E. B. Jones, Chester, England

[73] Assignee: Imperial Chemical Industries PLC, London, England

[21] Appl. No.: 39,459

[22] Filed: Apr. 17, 1987

[30] Foreign Application Priority Data

Apr. 29, 1986 [GB] United Kingdom ............... 8610469

[51] Int. Cl.$^4$ ............................................. C08G 73/10
[52] U.S. Cl. ................................... 528/322; 528/321
[58] Field of Search ................................ 528/322, 321

[56] References Cited

U.S. PATENT DOCUMENTS

| | | | |
|---|---|---|---|
| 3,669,930 | 6/1972 | Asahara et al. | 528/322 |
| 3,883,486 | 5/1975 | Bargain | 528/322 |
| 4,266,047 | 5/1981 | Jablonski et al. | 528/322 |
| 4,283,522 | 8/1981 | Takahashi et al. | 528/322 |
| 4,299,946 | 11/1981 | Balme et al. | 528/322 |
| 4,731,436 | 3/1988 | Ling | 528/322 |

Primary Examiner—Harold D. Anderson
Attorney, Agent, or Firm—Cushman, Darby & Cushman

[57] ABSTRACT

A cross-linked polyamide which is preparable by the reaction of a polyimide with a polyamine wherein the functionality of one of the aforesaid reagents is at least two and the functionality of the other reagent is more than two. The cross-linked polyamides are useful as the matrix in high-performance, e.g. carbon fiber, composites.

20 Claims, 5 Drawing Sheets

CROSS-LINKED POLYMER FROM AROMATIC DICARBOXYLIC ACID ANHYDRIDE IMIDE

This invention relates to cross-linked polymers which are able to withstand continuous working conditions at high temperature, e.g. at least about 200° C., and particularly to such polymers which may be used as matrices in fibre-reinforced composites.

There is a continuing demand for improvements in high-performance cross-linked polymers. By "high performance" we mean retention of strength at high temperature, stability to harsh environments and a good combination of mechanical properties, e.g. toughness.

For example, in the case of certain known cross-linked polymers used in fibre-reinforced composites, i.e. epoxy resins, in an attempt to increase the working temperature which they can withstand, the cross-link density thereof has been increased by using an epoxide component which bears greater than two epoxide groups in each monomer. However, the use of high functionality to afford high cross-linked density and high Tg often compromises the toughness of the product.

Additionally, attempts have been made to combine high working temperature with low cross-link density, e.g. by having reactive groups at the ends of long oligomer chains. Whilst there is a tendency for the cross-linked products from such long oligomer chains to be able to withstand a high use temperature, e.g. 190° C., the starting oligomers often have an unacceptable combination of high softening point and high viscosity.

We have now found that (i) certain cross-linked polyamides as hereinafter defined can be prepared; (ii) they often have a combination of high working temperature, good thermal stability and good solvent resistance; (iii) they are often suitable for use as the matrix in fibre-reinforced composites; and (iv) the process for the preparation thereof is adaptable to hand lay-up procedures.

The preparation of the aforesaid certain cross-linked polyamides may be effected by reacting an organic compound bearing at least two imide groups (which compound is hereinafter referred to for convenience as a "polyimide") with an organic compound bearing at least two amino groups, which may be primary or secondary amino groups, (which compound is hereinafter referred to for convenience as a "polyamine") wherein at least one of the compounds has a functionality of more than two.

According to a first aspect of the present invention there is provided a cross-linked polyamide characterised in that it is preparable by the reaction of a polyimide with a first polyamine wherein the functionality of one of the aforesaid reagents is at least two and the functionality of the other reagent is more than two.

A second aspect of the present invention provides a process for the preparation of cross-linked polyamides characterised in that a polyimide and a first poly(primary or secondary)amine are reacted under suitable conditions wherein the functionality of one of the reagents is at least two and the functionality of the other reagent is more than two.

By "functionality" we mean the average number of imide groups in the polyimide or the average number of amine groups in the polyamine.

Preferably the cross-linked polyamide according to the first aspect of the present invention comprises a plurality of repeat units of the general formula

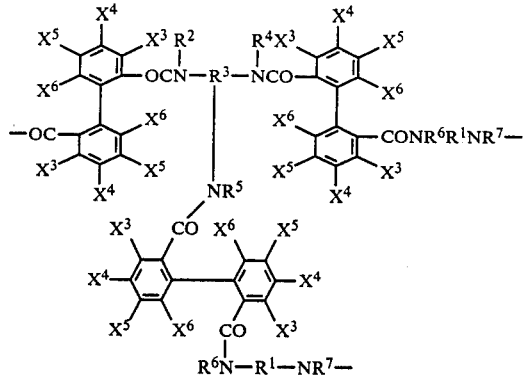

wherein
$R^1$ and $R^3$, which may be the same or different, are divalent organic groups;
$R^2$, $R^4$, $R^5$, $R^6$ and $R^7$, which may be the same or different, are hydrogen or lower alkyl groups having up to five carbon atoms; with the proviso that (i) where $R^2$, $R^4$ and $R^5$ are lower alkyl groups, $R^6$ and $R^7$ are hydrogen and (ii) where $R^6$ and $R^7$ are lower alkyl groups, $R^2$, $R^4$ and $R^5$ are hydrogen;
$X^3$, $X^4$, $X^5$ and $X^6$, each of which may be the same or different, are hydrogen or substituents which do not unduly adversely affect (i) the properties of the cross-linked polyamides according to the first aspect of the present invention or, (ii) the preparation thereof by the process according to the second aspect of the present invention.

Within the scope of the term divalent organic group are included inter alia divalent hydrocarbyl groups, which may be linear or branched, e.g. alkyl, aryl, alkaryl, or aralkyl; and divalent hydrocarbyl groups which are substituted with one or more in-chain or pendant hetero-atoms. Examples of suitable in-chain hetero-atoms include inter alia O and S and combinations thereof. Examples of suitaable pendant hetero-atoms include inter alia halogen, e.g. chlorine.

As examples of the aforesaid divalent hydrocarbyl groups may be mentioned inter alia $—(CH_2)_n—$, where n is an integer, e.g. 2, or 6; phenylene; xylylene; and di-phenylene-methane.

Examples of divalent hydrocarbyl groups which are substituted with one or more in-chain hetero-atoms include inter alia $—(CHR^8CHR^8O)_m CH_2CH_2—$, where m is an integer, e.g. 4, and $R^8$ is H or methyl except that both $R_8$'s are not methyl; $—(CH_2)_4—O;13 (CH_2)_4$; or preferably $—(\phi—X—\phi)_p$ where, $\phi$ is the phenylene group, X, each of which may be the same or different, represents $—O—$, $—SO_2—$, $—CONH—$, $—CO—$, and p is an integer from 0 to typically 15.

Where high temperature stability or a high Tg is required in polyamides of the general formula I $R^1$ and $R^3$ are preferably aromatic groups. More preferably, $R^1$ and $R^3$ are chains of aromatic groups containing in-chain carbon atoms, e.g. $—CH_2—$, or hetero-atoms, e.g. $—O—$ or $—SO_2—$; the aforesaid chains confer additional desirable properties, e.g. the ability to control (a) the solubility of oligomers, where present, and (b) the softening point and cross-linked density of the polyamide; $R^2$ and $R^4$ are preferably hydrogen.

In cross-linked polyamides of the general formula I, preferably $X^6$ is hydrogen, particularly preferably $X^3$ and $X^6$ are separately hydrogen and more particularly preferably $X^3$, $X^4$, $X^5$ and $X^6$ are separately hydrogen. Where $X^3$, $X^4$, $X^5$ or $X^6$ are substituents, examples thereof include inter alia lower alkyl groups, e.g. methyl, or halo groups, e.g. chloro; we do not exclude the possibility that where two of the aforesaid $X^3$, $X^4$, $X^5$ and $X^6$ are substituents such substituents may join to form a further ring which may be aromatic or alicyclic. Where $X^6$ is not hydrogen it may be chosen such that it facilitates or hinders rotation about the phenylene-phenylene bond of the biphenyl residue. For example, $X^6$ may be chosen such that it facilitates ring closure in formation of the imide groups in the polyimide; alternatively, it may facilitate ring opening of the imide in preparation of the polyamide according to the present invention or hinder ring opening and hence facilitate control of a fast reaction, e.g. where a labile imide or reactive amine is used in preparation of a polyamide; or it may increase the glass transition temperature of the cross-linked polyamide.

The relative proportions of the reagent of functionality at least 2.0 and the reagent of functionality greater than 2.0 used in the process according to the second aspect of the present invention will depend inter alia upon the required properties of the cross-linked polyamide prepared therefrom and the polymerisation conditions to be employed. Typically, the ratio of imide groups to amine groups is about 1:1.

The reagent which has a functionality of more than two may be an individual compound or may be a mixture of compounds having an average functionality specified herein.

In a preferred embodiment of the process according to the second aspect of the present invention (i) a bisimide of the general formula:

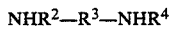

II

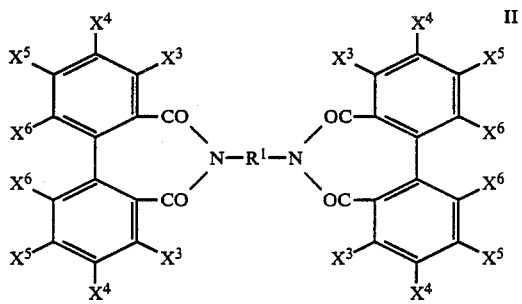

is reacted with a first polyamine of the general formula

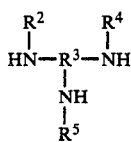

III or (ii) a tris-imide of the general formula

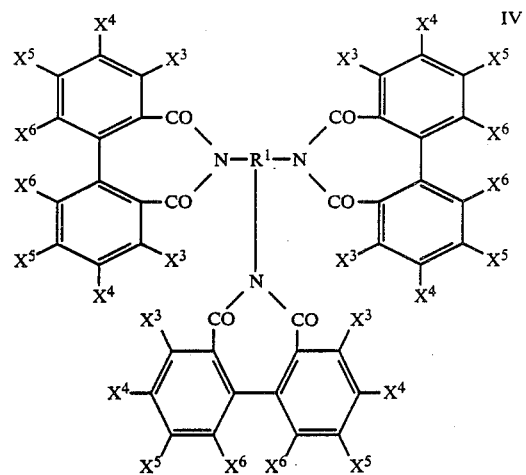

IV is reacted with with a first diamine of the general formula $$NHR^2-R^3-NHR^4 \qquad V$$

wherein $R^1$, $R^2$, $R^3$, $R^4$, $R^5$, $X^3$, $X^4$, $X^5$ and $X^6$ have the meanings hereinbefore ascribed to them. Where $R^3$ in the first polyamine of the general formulae III or V represents an alkylene chain, which may be substituted, e.g. with in-chain or pendant atoms or groups, or unsubstituted, it is preferred that the $\alpha$, $\omega$ groups of the alkylene chain are methylene groups. It is preferred that $R^1$ is aromatic since this increases the reactivity of the imide group in the polyimides of the general formulae II or IV as well as contributing to the thermal stability of the polyimide prepared therefrom. Further, it has been found that the rate of polymerisation in the process according to the second aspect of the present invention tends to be proportional to the $pK_b$ of the first polyamine which is reacted with the polyimide; thus, for example, an aliphatic diamine, e.g. $NH_2(CH_2)_6NH_2$, reacts faster than an aromatic diamine, e.g. $NH_2ArCH_2ArNH_2$, which in turn reacts faster than an aromatic diamine which bears a substituent which lowers the $pK_b$ of the amino group, e.g. para-$NH_2ArSO_2ArNH_2$ (where Ar is an aromatic group, e.g. phenylene). Accordingly, where a rapid reaction is required in the process according to the second aspect of the present invention it is preferred to use a first polyamine of the general formula III or V in which $R^3$ is an alkyl group having up to 20 carbon atoms and $R^2$, $R^4$ and $R^5$, where present, are hydrogen.

The process according to the second aspect of the present invention is preferably carried out by reacting neat reactants.

Where it is desired that any of $X^3$, $X^4$, $X^5$ or $X^6$ in general Formula I are substituent groups we do not exclude the possibility that such substituents may be introduced into the polyamide of the first aspect of the present invention after it has been prepared.

A third aspect of the present invention provides compositions comprising a polyimide of functionality more than two prepared by reacting a dicarboxylic anhydride with a second polyamine which bears more than two primary amino groups; preferably the composition comprises a tris-imide of the general formula IV.

The polyimide used in the process according to the second aspect of the present invention is preferably derivable by the reaction of a second polyamine with sufficient of one or more dicarboxylic acid anhydrides such that each amino group in the second polyamine is converted into a imide group. We do not exclude the possibility that the polyimide may be prepared by reacting a compound bearing a plurality of dicarboxylic acid anhydride residues with sufficient mono-amine to convert each of the anhydride residues into an imide group; however, this is not preferred.

The dicarboxylic acid anhydride from which polyimides used in the process according to the second aspect of the present invention may be prepared may be aliphatic, e.g. succinic anhydride or adipic anhydride, or preferably aromatic, e.g. phthalic anhydride or 1,8-napthalic anhydride or more preferably 2,2'-diphenyldicarboxylic acid anhydride (which is hereinafter referred to for convenience as "diphenic anhydride").

Polyimides for use in the process according to the second aspect of the present invention, e.g. of the general formulae II or, IV may be prepared by reacting diphenic anhydride with a suitable polyamine, e.g. a diamine of the general formula:

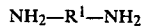

NH$_2$—R$^1$—NH$_2$     VI or a triamine of the general formula

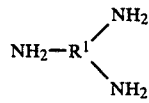

VII respectively, wherein

R$^1$ has the meaning hereinbefore ascribed to it.

In the preparation of a polyimide, the proportion of dicarboxylic acid anhydride and second polyamine, e.g. diamine or triamine, are chosen such that substantially all the amino groups of the second polyamine and substantially all the dicarboxylic acid anhydride groups are converted into imide groups. For example, in the preparation of a bis-imide of the general formula II, typically, the diamine of the general formula VI is reacted with a solution, preferably a non-aqueous solution, and more preferably a solution in a polar aprotic solvent, of a suitable dicarboxylic acid anhydride, e.g. diphenic anhydride.

The reaction may be carried out at a temperature in the range of 0° C. to 150° C. Conveniently, the anhydride, preferably neat, is added to a solution of the diamine in a suitable solvent. It will be appreciated that the reaction is a two step reaction. In the first step the anhydride rings are opened to generate an amic-acid. In the second step, cyclisation occurs with elimination of water. The second step is preferably carried out in the presence of a suitable dehydrating agent, for example an anhydride, e.g. acetic anhydride, and a weak base, e.g. sodium acetate. The first step is preferably carried out at between 0° C. and 20° C. and the second step is preferably carried out between 50° C. and 100° C. We do not exclude the possibility that the second step may be carried out as a melt.

The cross-linked polyamides of the present invention may be used as the matrices for fibre-reinforced composites. In such composites, suitable fibre reinforcing materials include, for example, glass, e.g. in the form of mat, tapes, continuous fibre or chopped rovings; inorganic mineral fibres; or preferably fibres of suitable high temperature resistant organic fibres, e.g. a poly aromatic amide, e.g. Kevlar (RTM); or more preferably carbon fibre.

Where a cross-linked polyamide according to the present invention is used as a matrix for a fibre-reinforced composite, such a composite may be produced, for example, by placing fibres, for example carbon fibres, in a mould of a desired shape and impregnating the fibres with a composition which comprises a polyimide and a first polyamine wherein the functionality of one of the reagents is at least two and the functionality of the other reagent is more than two, e.g. (i) a mixture of a bis-imide of the general formula II with a triamine of the general formula III; or (ii) a mixture of a tris-imide of the general formula IV with a diamine of the general formula V. Preferably, however, a mixture of polyimide and the first polyamine are partially reacted to form a prepolymer or so-called "B-stage" intermediate which is substantially linear. The fibres are then impregnated with this prepolymer to form a so-called "prepreg". The fibres and the aforesaid prepreg are heated to an appropriate temperature, e.g. 200° C.–300° C., often at a pressure of about 200 psi, for typically up to about a few hours, to effect cross-linking of the prepolymer and to form a fibre-reinforced composite. We do not exclude the possibility that the aforesaid mixture may comprise an epoxy resin which is cured by reaction with a portion of the first polyamine.

Where the aforesaid prepolymer is a solid or is very viscous, and is thus not sufficiently fluid for satisfactory impregnation of the fibres, it may be diluted with, e.g. dissolved in, a polar aprotic solvent, e.g. N,N-dimethylacetamide, in order to provide a mixture of the desired fluidity for impregnating the fibres. Where a mixture of, for example, the polyimide of the general formula II and the first polyamine of the general formula III in a suitable solvent is used to impregnate the fibres the solvent may be caused or allowed to evaporate before the reaction of the aforesaid reagents is initiated.

We do not exclude the possibility that cross-linked polyamides according to the first aspect of the present invention may be prepared by the polymerisation of an appropriate poly-imido-amine wherein there is (i) an average of more than one of the groups, preferably the amino group, per molecule and (ii) an average of at least one of the other groups per molecule

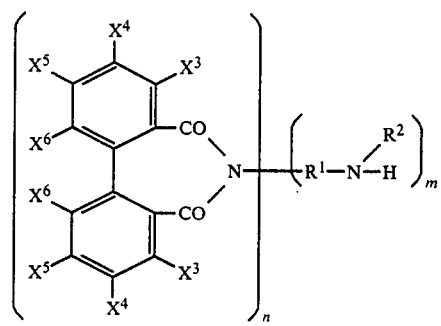

VIII

Wherein n, or m, or both is greater than 1. It will be appreciated that linear polyamides can likewise be prepared by the polymerisation of a poly-imido-amine having an average one amino group and one imide group per molecule, e.g. of general formula VIII wherein n=m=1.

The cross-linked polyamides of the present invention may include inter alia heat and light stabilisers, antioxidants, colouring pigments and particulate filler materials, e.g. chalk, calcium carbonate, talc, mica, carbon black and glass.

In the drawings accompanying this specification:

FIGS. 1, 2, 3 and 4 illustrate the variation in certain properties of the cross-linked polyamides according to the first aspect of the present invention with the formation time of the prepolymer as hereinafter defined; and FIGS. 5, 6, 7, 8 and 9 illustrate the variation in certain properties of the aforesaid cross-linked polyamides with the ratio of polyimide to first polyamine used in the preparation thereof.

The present invention will be further illustrated with reference to, but not limited by, the following Examples.

EXAMPLE 1

This Example illustrates the preparation of a bis(-biphenyl-2,2'-dicarboxylimide) for use in the process according to the first aspect of the present invention.

Diphenic anhydride (9.3 g, 0.042 moles) was added as a solid, to a cooled (0°–15° C.), stirred solution of 4,4'-diaminodiphenyl methane (4.1 g, 0.021 moles) in dry N,N-dimethyl-acetamide (30 ml), over a period of 1.5 hours. The mixture was warmed to room temperature and stirred for 1 hour, acetic anhydride (4.7 g, 0.046 moles) and triethylamine (0.4 g, 0.004 moles) were added and the mixture was stirred for a further 4 hours. A small sample of the mixture was added to water; infra-red spectroscopy on the sample of product isolated therefrom indicated incomplete reaction. A further portion of acetic anhydride (10 ml), dry sodium acetate (c.a. 4 g), and N, N-dimethylacetamide (20 ml) were added to the mixture and it was heated to 80° C. for 1 hour. The mixture was allowed to stand overnight and was then added to water. The pink solid which precipitated was filtered, washed with water, dried and recrystallised from dimethyl sulphoxide to give white crystals, m.p. 313° C.; the infra-red, mass spectrum and elemental analysis (Found: C, 79.95; H, 3.91; N, 4.36; calculated for $C_{41}H_{26}N_2O_4$: C, 80.64; H, 4.29; N, 4.59) of the white crystals were consitent with those of 4,4'-bis-(diphenyl-2,2'-dicarboxylimide)-diphenylmethane.

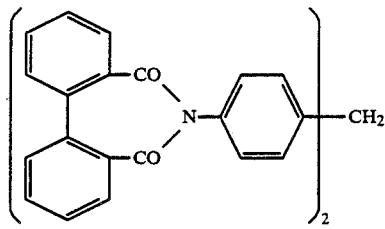

EXAMPLE 2

This example illustrates the preparation of a cross-linked polyamide according to the present invention.

A portion (6.1 grams) of the diimide prepared in Example 1 and a mixture (2.1 grams) of aromatic primary amines (comprising 55% w/w 4,4'-diamino-diphenyl methane and 45% w/w of oligomeric polyamines of the general formula

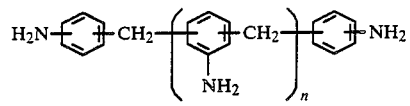

were heated in a nitrogen-purged tube until molten. The molten reaction mixture was agitated for 30 seconds to ensure efficient mixing and vacuum was applied thereto to remove residual volatiles. The reaction mixture was then cooled and a brittle, transparent, glassy prepolymer was obtained.

A first portion (2.5 grams) of the prepolymer was heated in an open metal cup for 2 hours at 290° C. and a transparent, strong polymer was obtained. Samples of the polymer were analysed by TMA and DSC, both techniques revealed that it had a glass-transition temperature of 250° C.

A second portion (1.4 grams) of the prepolymer was disposed in a circular metal mould (of diameter 2.5 cms and height 0.2 cms) and compression moulded at 285° C. and a pressure of 1000 Newtons for 2 hours. The resulting moulding was strong, transparent and insoluble in warm dimethylacetamide.

A third portion (0.6 grams) of the prepolymer was compression moulded under the conditions hereinbefore described to give a moulding measuring 2.5 cm × 1.0 cm × 0.1 cm. Dynamic mechanical analysis of the moulding revealed that it had a Tg (defined by the peak of the tan δ loss) of 265° C.

Samples of the above described compression mouldings were immersed in water at 25° C. and were found to have an equilibrium water uptake of 2.45 wt %.

A further portion of the prepolymer was compression moulded at 300° for 30 mins to give a square plaque measuring 5 cm × 5 cm × 0.1 cm. The flexural properties of samples machined from the plaque were found to be (at 20° C.); flexural strength: 121.8 MPa; flexural modulus: 2.48 GPa.

EXAMPLE 3

This example illustrates the preparation of a polyimide according to the third aspect of the present invention.

Diphenic anhydride (9.3 grams) was added over 50 minutes to a stirred solution of a mixture (4.0 grams) as defined in Example 2 of aromatic primary amines in dry N,N-dimethylacetamide (22 grams) at 10° C. The temperature was then raised to 25° C. and after 15 minutes, tri-ethylamine (0.5 grams) and acetic anhydride (11 grams) were added. The temperature of the reaction mixture was then raised to 70° C. for 30 minutes and it was then allowed to stand at 20° C. for 18 hours.

A product which precipitated out was filtered, washed repeatedly with 30 ml aliquots of distilled water, filtered and dried at 70° C. under vacuum for 3 hours. A powder (9.6 grams) was obtained, the infrared spectrum of which was consistent with the structure

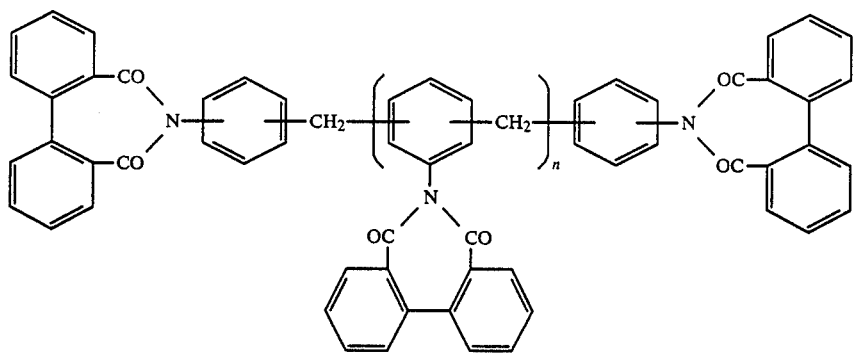

The powder had no well-defined melting point; it had a stick temperature of about 200° C. on the Kofler bar; and formed a clear stable melt at about 240° C.

EXAMPLE 4

This example illustrates the preparation of a cross-linked polyamide according to the present invention.

A portion (1.40 grams) of the poly-imide prepared in Example 3 and a mixture (0.48 grams) as defined in Example 2 of aromatic primary amines were melted, mixed and degassed as described in Example 2. After cooling, the brittle transparent glass was compression moulded at 300° C. for 1 hour and a strong transparent moulding was obtained which had a glass transition temperature (by DSC) of 248° C.

EXAMPLE 5

This example illustrates the preparation of a diimide for use in the process of the present invention.

Diphenic anhydride (8.96 grams) was added portionwise, as a solid, over 1.5 hours to a solution, cooled to 4° C., of 4,4'-diaminodiphenylsulphone (4.96 grams; dried at 60° C. under vacuum for 1 hour) in N,N-dimethylacetamide (80 mls; dried over 5A molecular sieve); during the addition, the temperature of the solution was allowed to rise slowly to 20° C. The temperature of the reaction mixture was then raised to 65° C., a clear solution formed, and the temperature was held at 50° C. for 1 hour. The reaction mixture was allowed to stand overnight at room temperature.

Triethylamine (2 mls) and then acetic anhydride (25 mls) were added to the reaction mixture which was warmed to 70° C. and allowed to stand for 1 hour. On cooling, the solution gave a precipitate which was filtered, washed with water and then methanol, and dried under vacuum at 60° C. for 2 hours to afford a product (6.5 grams). The product was crystallised from boiling dimethylacetamide and yielded a white crystalline material, m.p. 314°–319° C., the mass spectrum of which was consistent with that of a diimide of the structure

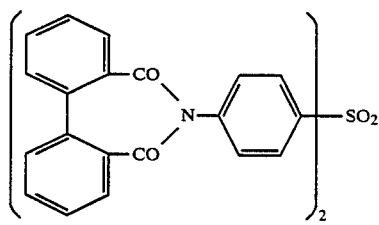

EXAMPLE 6

This example illustrates the preparation of a cross-linked polyamide according to the present invention.

A portion (1.74 grams) of the diimide prepared in Example 5 and a mixture (0.55 grams) as defined in Example 2 of the aromatic primary amines were melted, mixed and degassed as described in Example 2. A portion (0.5 grams) of the resultant glassy pre-polymer was compression moulded at 300° C. for 30 minutes; a strong, transparent moulding of dimensions 2.5×1.0×0.1 cms was obtained. Dynamic mechanical analysis of the moulding revealed that it had a $T_g$ as defined in Example 2 of 286° C. and little change in modulus between 20° C. and 230° C.

EXAMPLE 7

This Example illustrates the preparation of a cross-linked polyamide according to the present invention.

A portion (0.80 grams) of a polyamine ($M_n$=805, $M_w$=2052 and containing 4.6% w/w nitrogen as aromatic amine) prepared by the process described in Example 40 of European Patent Specification No. 0,112,650A and a portion (0.80 grams) of the diimide prepared in Example 1 were melted, mixed and degassed as described in Example 2. A pre-polymer was obtained in the form of a pale yellow glass which had a stick temperature on the Kofler block of 190°–200° C.

A portion (0.5 grams) of the pre-polymer was compression moulded at 290° C. for 30 mins, a strong moulding which was insoluble in N,N-dimethylacetamide was obtained, and had a glass transition temperature of about 200° C.

EXAMPLE 8

This example illustrates the preparation of a cross-linked polyamide according to the present invention.

A portion (0.61 grams) of the polyamine described in Example 7 was reacted with a portion (0.66 grams) of the diimide prepared in Example 5. The product was compression moulded at 300° C. for 50 minutes; a dark, transparent, strong moulding which was insoluble in N,N-dimethylacetamide was obtained.

EXAMPLES 9–11

These Examples illustrate the preparation of diimides for use in the process of the present invention.

Diphenic anhydride (9.3 grams; 0.042 moles) was added as a solid to a cooled (0°–15° C.) stirred solution an appropriate diprimary amine (0.021 mole) in dry N,N-dimethyl-acetamide (30 mls) over 1.5 hours. The mixtures were warmed to room temperature and stirred for 1 hour. Acetic anhydride (14.3 mls) and triethylamine (0.4 grams; 0.004 moles) were added and the mixture was stirred for a further 1 hour at 80° C. It was then cooled to room temperature, allowed to stand overnight and added to a stirred water/ice mixture. A solid precipitate was filtered, washed with water and dried under vacuum.

Details of the amines used in the Examples and the properties of the polyimides prepared in the Examples are shown in Table 1.

TABLE 1

| Example No | Amine Name/Source | Amine mp/sp (°C.) | Imide mp/sp (°C.) | Imide Solubility |
|---|---|---|---|---|
| 9 | m-phenylene-diamine | 62 | 281 | less than 5% w/v in low boiling point solvents |
| 10 | Prepared by fractionational distillation of the mixture of amines described in Example 2: it contains less than 20% methylene-diamiline. | Liquid | 165–185 | 25% w/v in CH$_2$Cl$_2$ |
| 11 | Amine described in Example 7 | 50–70 | 150–180 | more than 30% w/v in CH$_2$Cl$_2$ |

EXAMPLES 12–13

These Examples illustrate further cross-linked polyamides according to the present invention.

The procedure of Example 2 was repeated except that (i) the polyimides and polyamines described in Table 1 were used instead of the polyimide and polyamine described in Example 2 and (ii) curing of the prepolymer was effected under pressure at 300° C. for 1 hour. The glass transition temperature of the cross-linked polyamides are shown in Table 2.

TABLE 2

| Example No | Polyamide | Polyamide | Cross-linked Polyamide Tg(°C.) by DSC |
|---|---|---|---|
| 12 | Prepared in Example 9 | As described in Example 2 | 201 |
| 13 | Prepared in Example 10 | 4,4'-diamino-diphenylmethane | 242 |

EXAMPLE 14

This example illustrates the variation in properties which can be obtained.

Example 2 was repeated except that the mixture of amines was used in 15% w/w excess (2.41 grams instead of 2.1 grams).

The molten reaction mixture was heated and six portions thereof were removed at pre-determined periods of time between 0.5 minutes and 10 minutes (hereinafter referred to for convenience "prepolymer formation time"). On cooling, each portion gave a brittle, transparent, glassy prepolymer.

Each of the aforesaid prepolymers was separately placed in a metal mould (60 mm×12.7 mm×3.2 mm) and compression moulded at 300° C. under a pressure of 2 tons for 1 hour. The mechanical properties of the mouldings were determined at room temperature under the conditions defined in ASTM D790-71 (flexural strength and modulus), ASTM E399-83($K_{IC}$; so-called "plane strain fracture toughness") and Plati and Williams, Polymer Engineering and Science, 1975, Volume 15 (No 6), page 470 ($G_{IC}$; so-called "critical strain energy release rate").

FIGS. 1–4 illustrate the variation in properties with prepolymer formation time. From the Figures it can be seen that optimum mechanical properties are obtained for mixing times of between 1 and 3 minutes.

EXAMPLE 15

This Example illustrates the affect of polyimide:-polyamine ratio on the properties of the cross-linked polyamides.

Example 2 was repeated using portions (6.1 g) of the polyimide prepared in Example 1 and varous amounts (from 2.1 g (0% w/w excess amine mixture) to 2.83 g (35% w/w excess amine mixture)) of the aromatic primary amine mixture described in Example 2. The polyimide/polyamine mixtures were heated until molten and stirred for 3 minutes at 300°–320° C. under vacuum. They were then cooled and brittle, transparent, glassy prepolymers were obtained.

The prepolymers were cured and the mechanical properties of the cross-linked polyamides were determined as described in Example 12. The results are shown in FIGS. 5–9.

Figure 5:
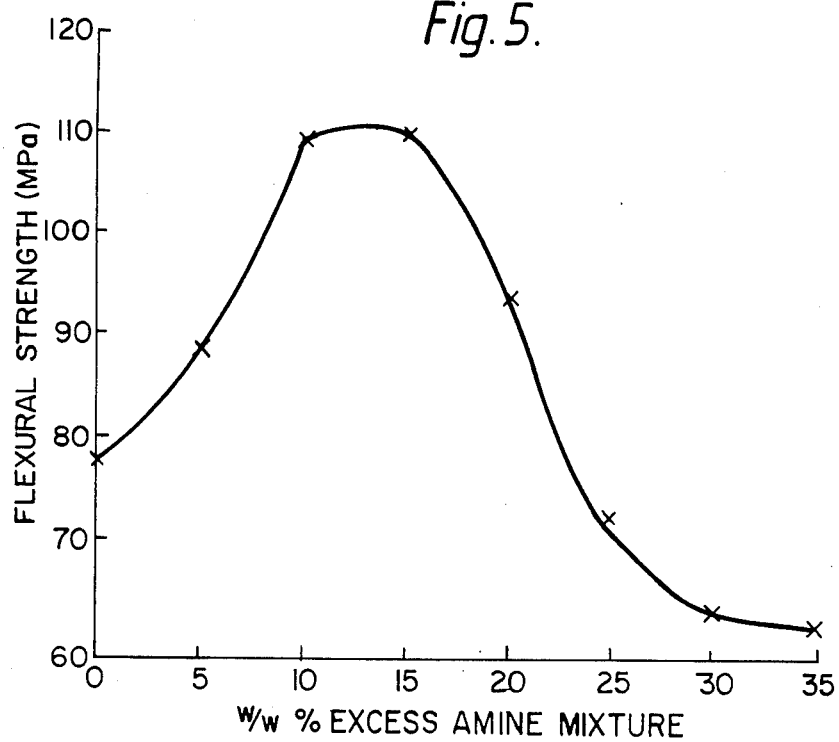
Figure 6:
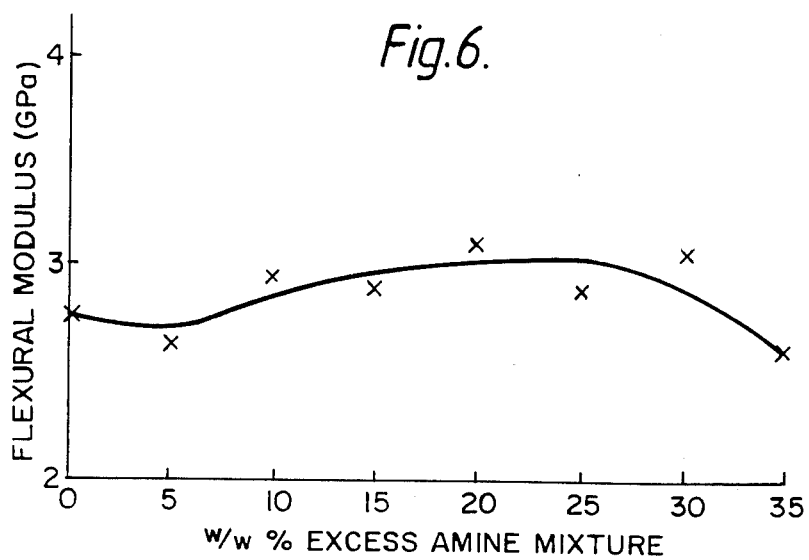
Figure 7:
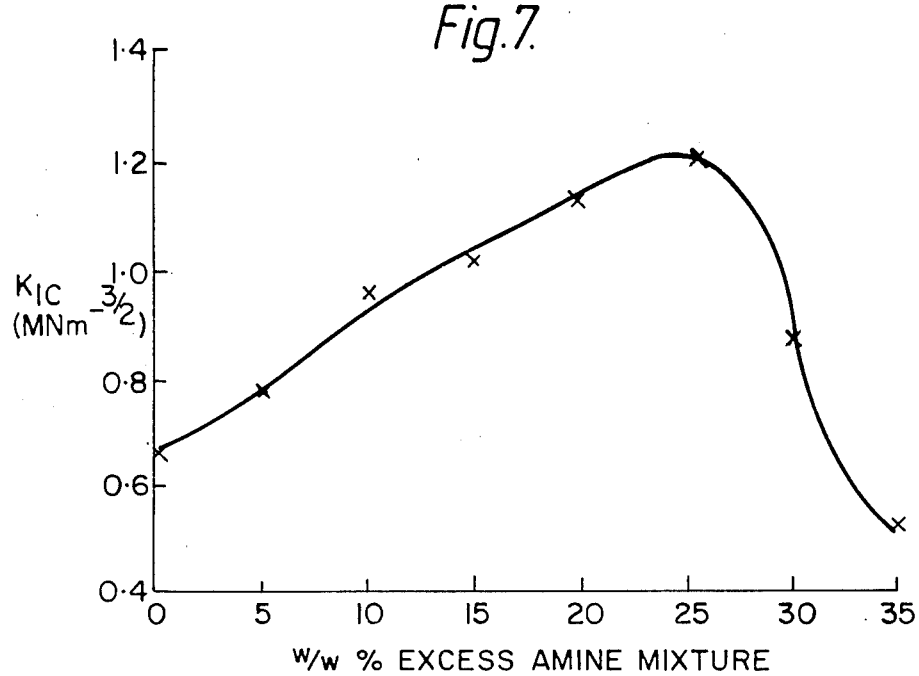
Figure 8:
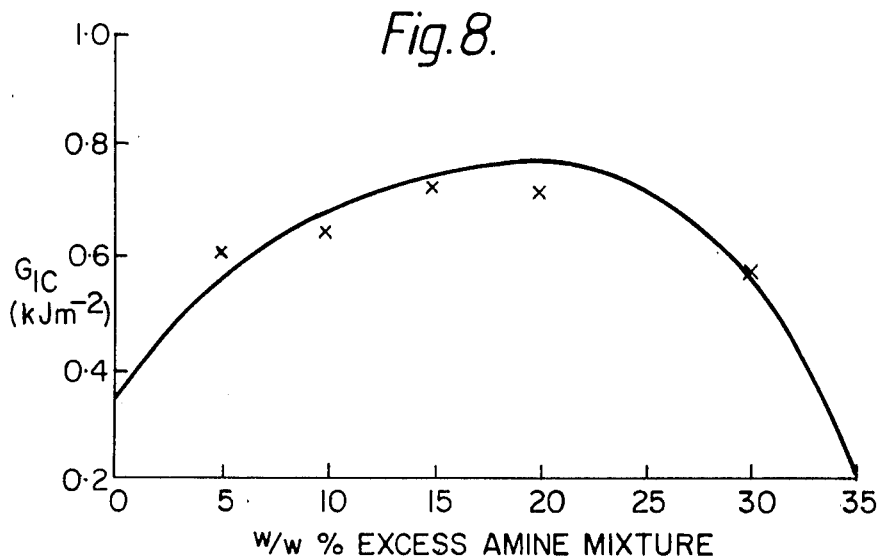
Figure 9:
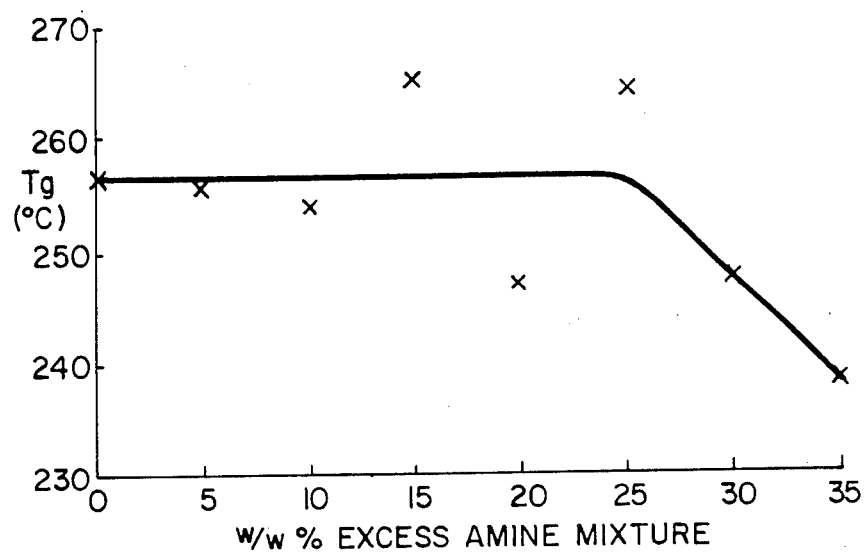

From FIGS. 5–9, it can be seen (i) that optimum strength is observed when about 10–15% w/w excess amine is used (FIG. 5); (ii) the highest modulus (FIG. 6) and toughness (FIGS. 7 and 8) are obtained with 15–25% w/w excess amine; and (iii) quantities of amine in the prepolymer in excess of about 30% w/w lower the glass transition temperature of the cross-linked polyamide (FIG. 9). In FIG. 9, Tg is measured by dynamic mechanical analysis and is defined as described in Example 2.

EXAMPLE 16

This Example illustrates the use of cross-linked polyamides according to the present invention as the matrix in carbon fibre composites.

A portion of a mixture of polyamine and polyimide as described in Example 2 was used, except that (i) a prepolymer formation time of 3 minutes (the optimum time as indiscated in Example 14) and (ii) an amine content of 20% w/w excess (the optimum as indicated in Example 15) were used.

Plain-weave carbon-fibre fabric was solution impregnated with 30–40% w/v solutions of prepolymers in N-methyl-2-pyrrolidone (NMP), or N,N-dimethylacetamide (DMAc), or methylene chloride/NMP (70/30% v/v) or methylene chloride/DMAc (70/30% v/v). After leaving the solvent to dry at room temperature overnight, drying of the prepolymer or so-called B-stage mixture was completed under vacuum at 120° C. Lay-up was carried out by hand and, for example, a 12-ply 6"×6" laminate was fabricated in a press at 300° C. for 2 hour under 2 ton pressure to yield a well consolidated, void-free carbon-fibre composite.

The mechanical properties of the composites were determined at room temperature and are shown in Table 3.

TABLE 3

| Flexural Strength[1] (MPa) | 599.9 |
|---|---|
| Flexural Modulus[1] (GPa) | 50.0 |

| TABLE 3-continued | |
|---|---|
| Interlaminar Shear Strength[2] (MPa) | 50.0 |
| Resin Solids (%) | 35.3 |
| Cured Ply Thickness (mm) | 0.21 |

[1]Test based on ASTM D790-71
[2]Test based on ASTM D2344-72

I claim:

1. A cross-linked product produced by the reaction of a polyimide reactant with a polyamine reactant wherein the functionality of one of the aforesaid reactants is at least two and the functionality of the other reactant is more than two, wherein said polyimide is derived from an aromatic dicarboxylic anhydride.

2. A cross-linked product as claimed in claim 1 which comprises a plurality of repeat units of the general formula

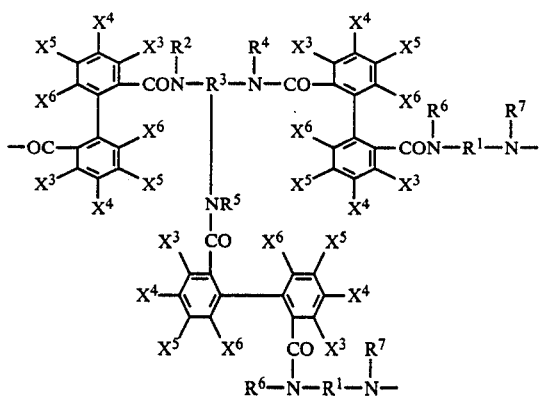

wherein
$R^1$ and $R^3$, which are the same or different, are divalent organic groups;
$R^2$, $R^4$, $R^5$, $R^6$ and $R^7$, which are the same or different, are hydrogen or lower alkyl groups having up to five carbon atoms; with the proviso that (i) where $R^2$, $R^4$ and $R^5$ are lower alkyl groups, $R^6$ and $R^7$ are hydrogen and (ii) where $R^6$ and $R^7$ are lower alkyl groups, $R^2$, $R^4$ and $R^5$ are hydrogen;
$X^3$, $X^4$, $X^5$ and $X^6$, each of which are the same or different, are hydrogen or substituents which do not adversely affect (i) the properties of the products or (ii) the preparation thereof by the process claimed in claim 1.

3. A cross-linked product as claimed in claim 2 wherein the divalent organic group is a substituted divalent hydrocarbyl group.

4. A cross-linked product as claimed in claim 3 wherein the substituted divalent hydrocarbyl group is $(\phi-X-\phi)_p$ wherein $\phi$ is the phenylene group; X, each of which are the same or different, represents —O—, —SO$_2$—, —CONH—, or —CO—; and p is an integer from 0 to 15.

5. A cross-linked product as claimed in claim 2 wherein $R^1$ and $R^3$ are aromatic groups.

6. A cross-linked product as claimed in claim 5 wherein the aromatic groups are in the form of chains containing in-chain carbon or hetero atoms.

7. A cross-linked product as claimed in claim 2 wherein $R^2$ and $R^4$ are hydrogens.

8. A cross-linked product as claimed in claim 2 wherein $X^3$ and $X^6$ are each hydrogen.

9. A cross-linked product as claimed in claim 8 wherein $X^3$, $X^4$, $X^5$ and $X^6$ are each hydrogen.

10. A process for the preparation of a cross-linked product characterized in that a polyimide reactant and a poly(primary or secondary)amine reactant are reacted together under suitable conditions and that the functionality of one of the reactants is at least two and the functionality of the other reactant is more than two, wherein said polyimide is derived from an aromatic dicarboxylic anhydride.

11. A process as claimed in claim 10 wherein a bisimide of the general formula

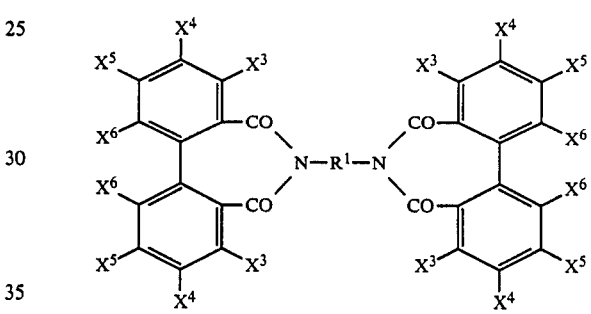

is reacted with a polyamine of the general formula

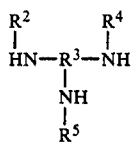

wherein $R^1$, $R^2$, $R^3$, $R^4$, $R^5$, $X^3$, $X^4$, $X^5$ and $X^6$ are defined in claim 2.

12. A process as claimed in claim 11 wherein, where $R^3$ represents an alkylene chain, the $\alpha$, $\omega$ groups thereof are methylene groups.

13. A process as claimed in claim 11 wherein $R^1$ is aromatic.

14. A process as claimed in claim 11 wherein $R^3$ is and alkyl group having up to 20 carbon atoms, and $R^2$, $R^4$ and $R^5$, where present, each represent hydrogen.

15. A process as claimed in claim 11 wherein neat reagents are reacted.

16. A process as claimed in claim 10 wherein a trisimide of the general formula

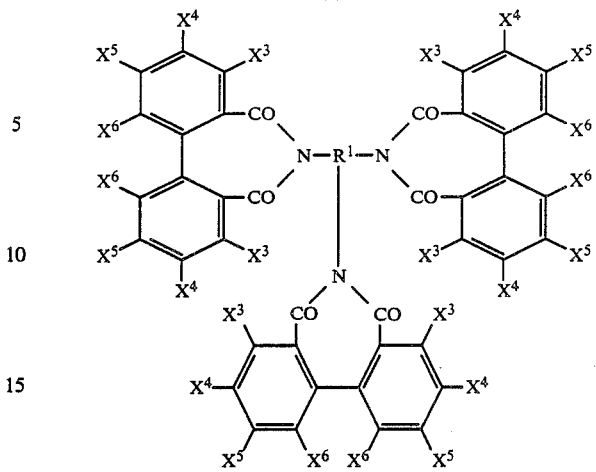

is reacted with a diamine of the general formula $$NHR^2-R^3-NHR^4$$

wherein $R^1$, $R^2$, $R^3$, $R^4$, $R^5$, $X^3$, $X^4$, $X^5$ and $X^6$ are defined in claim 2.

17. A process as claimed in claim 16 wherein, where $R^3$ represents an alkylene chain, the $\alpha$, $\omega$ groups thereof are methylene groups.

18. A process as claimed in claim 16 wherein $R^1$ is aromatic.

19. A process as claimed in claim 16 wherein $R^3$ is an alkyl group having up to 20 carbon atoms, and $R^2$, $R^4$ and $R^5$, where present, each represent hydrogen.

20. A process as claimed in claim 16 wherein neat reagents are reacted.

* * * * *